Jan. 7, 1964 J. L. OTSTOT 3,117,050
TUBE HOLE CUTTER AND VALVE SETTING MACHINE
Filed July 27, 1961 8 Sheets-Sheet 3

INVENTOR.
JAMES L. OTSTOT,
BY *Linton + Linton*
ATTORNEYS.

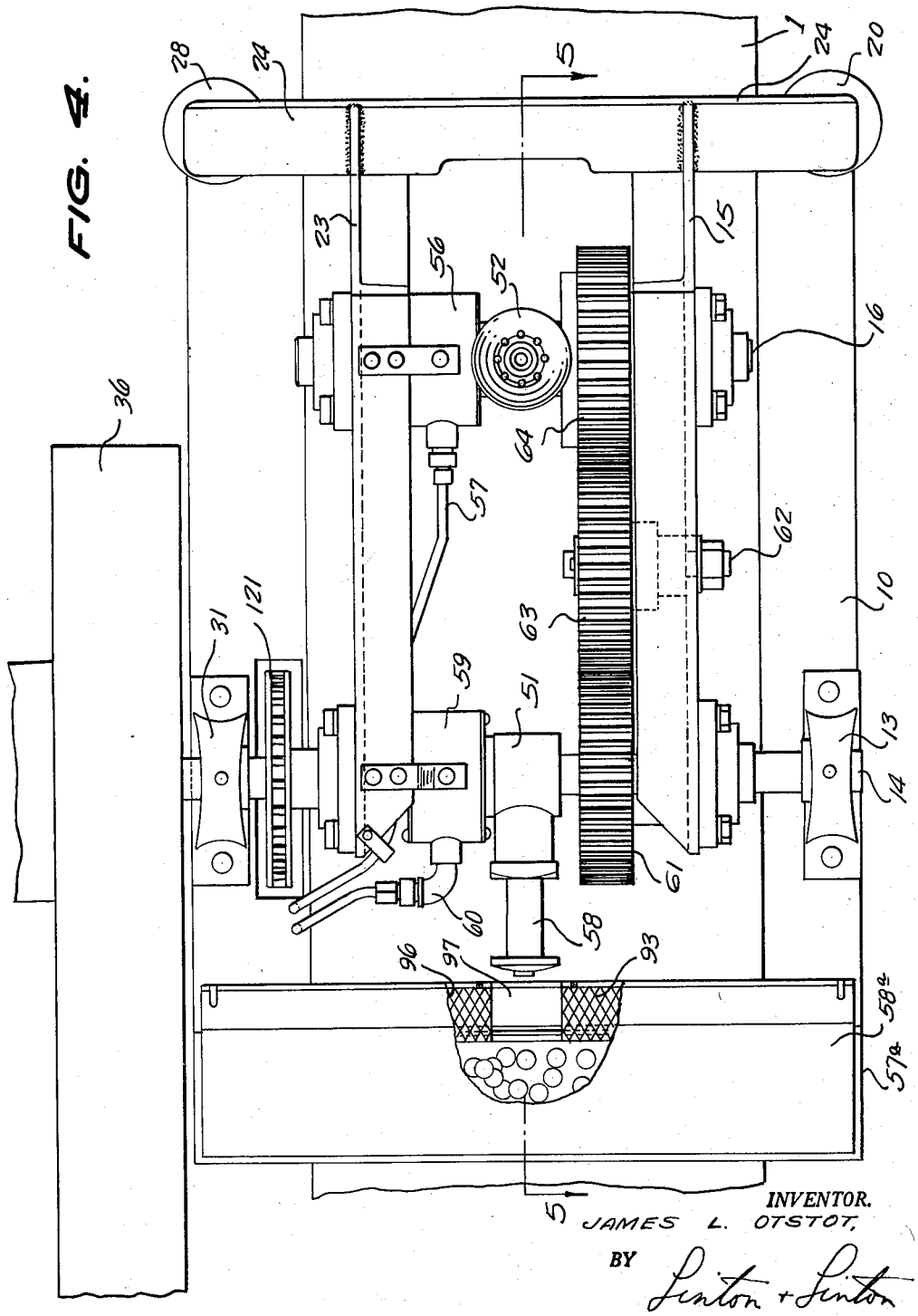

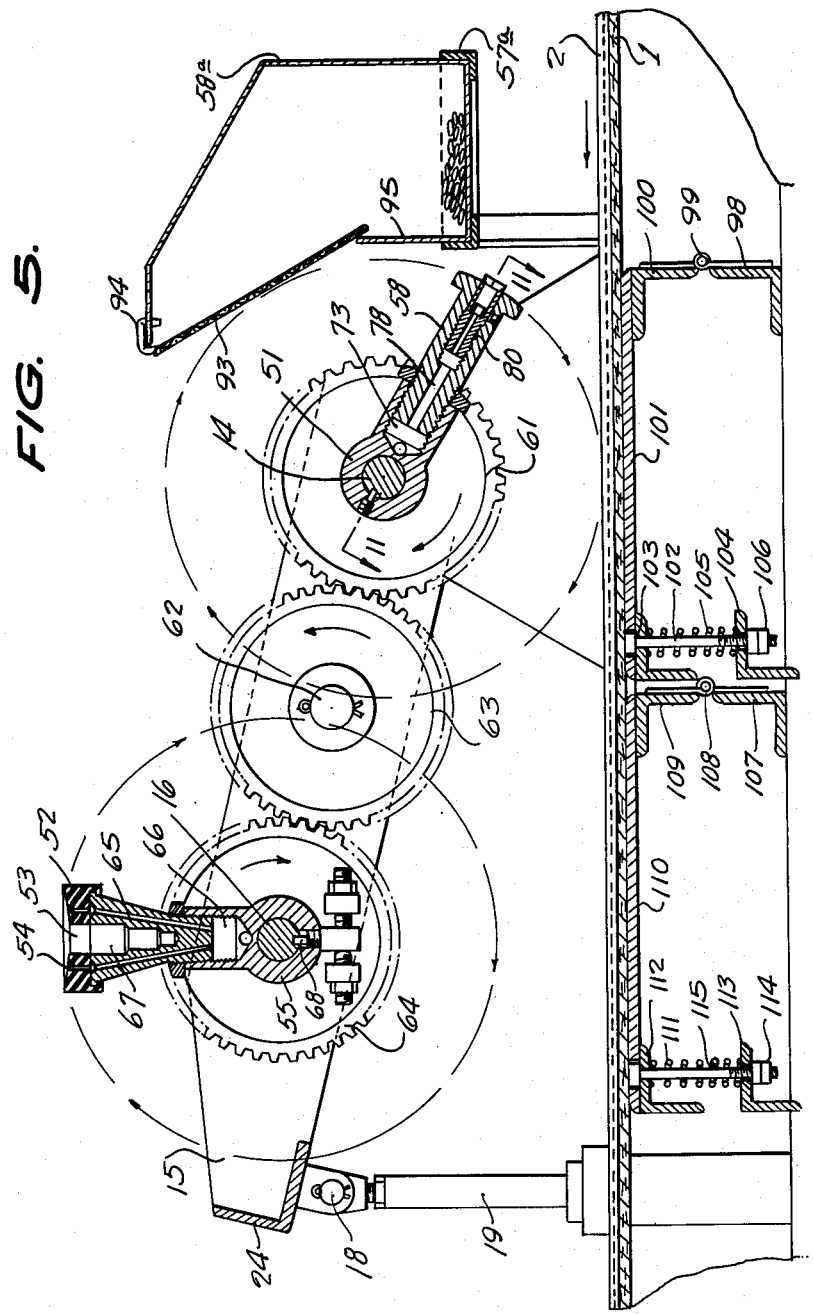

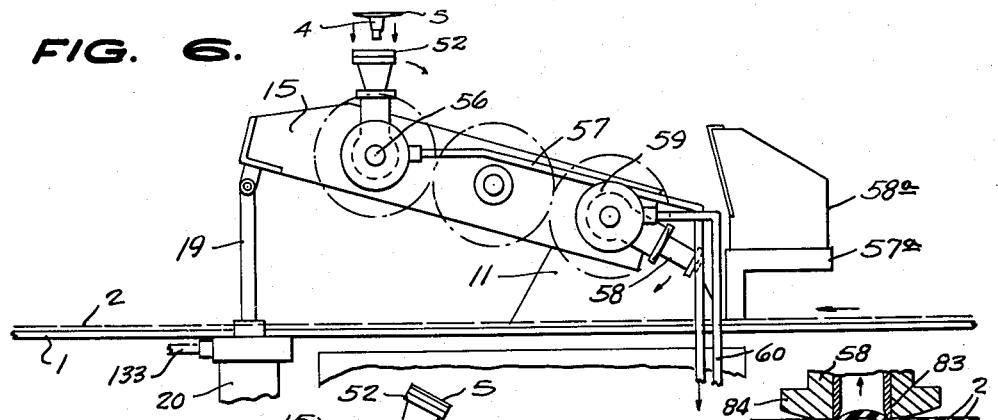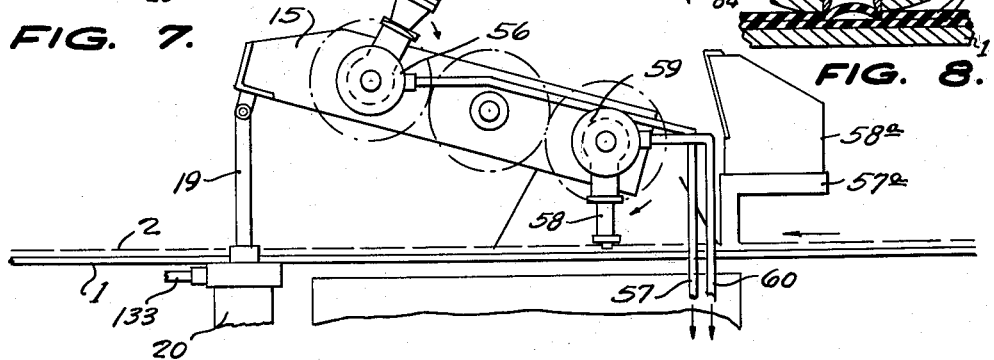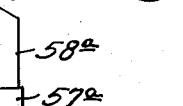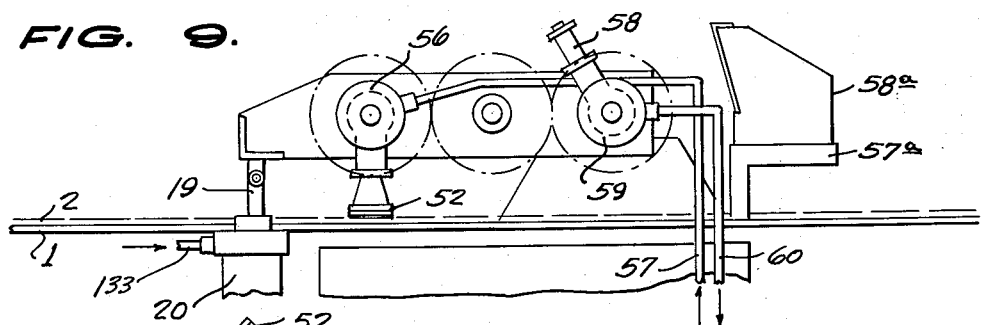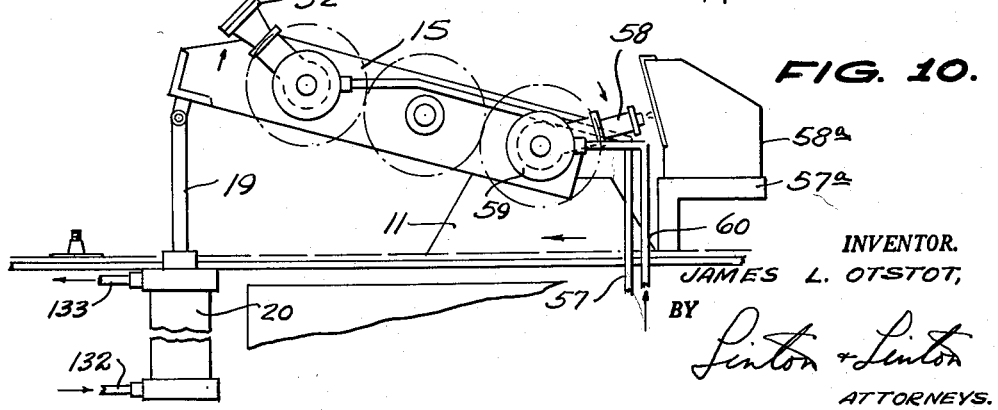

Jan. 7, 1964  J. L. OTSTOT  3,117,050
TUBE HOLE CUTTER AND VALVE SETTING MACHINE
Filed July 27, 1961  8 Sheets-Sheet 7

INVENTOR.
JAMES L. OTSTOT,
BY Linton & Linton
ATTORNEYS.

Jan. 7, 1964         J. L. OTSTOT         3,117,050
TUBE HOLE CUTTER AND VALVE SETTING MACHINE
Filed July 27, 1961         8 Sheets-Sheet 8
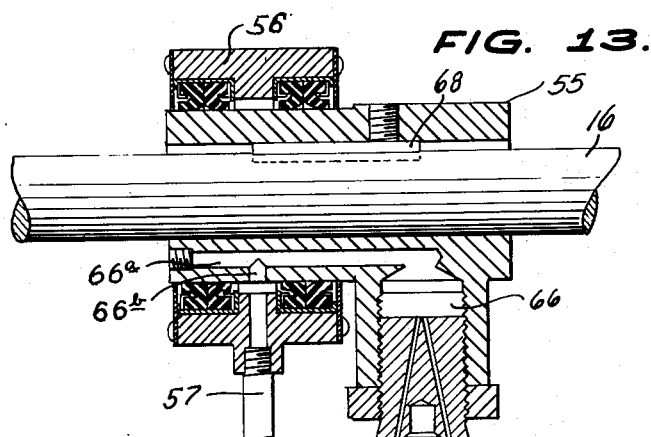
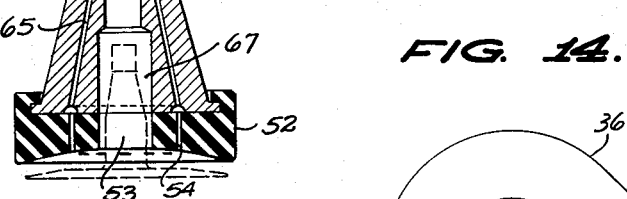
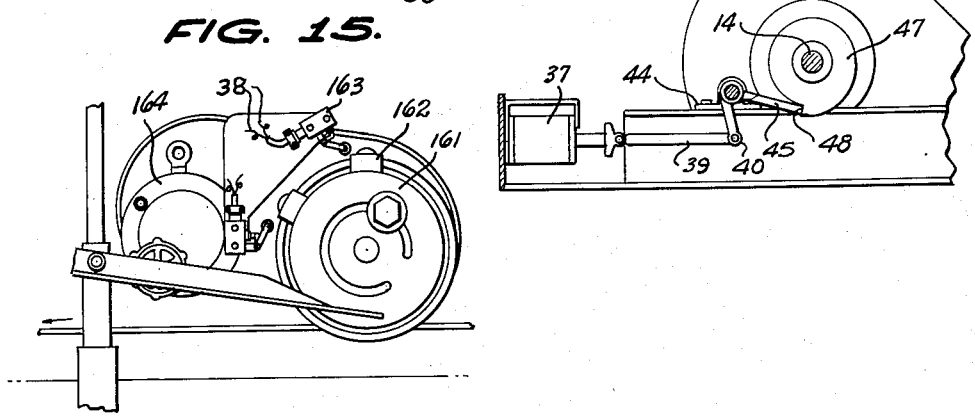
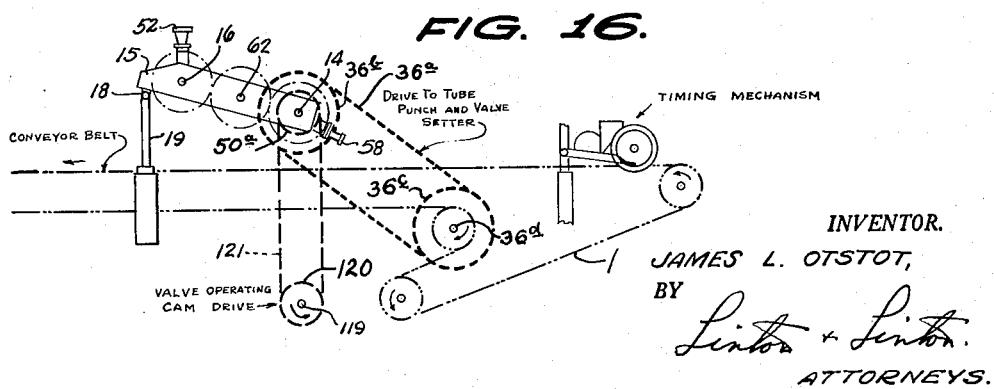
INVENTOR.
JAMES L. OTSTOT,
BY
Linton & Linton
ATTORNEYS.

United States Patent Office 3,117,050
Patented Jan. 7, 1964

3,117,050
TUBE HOLE CUTTER AND VALVE SETTING MACHINE
James L. Otstot, Carlisle, Pa., assignor to Carlisle Tire and Rubber Division of Carlisle Corporation, a corporation of Delaware
Filed July 27, 1961, Ser. No. 127,365
14 Claims. (Cl. 156—503)

The present invention relates to air valve inserting apparatus and is more particularly directed to an apparatus for inserting air valves into pneumatic inner tubes, especially during the manufacture of such tubes.

The principal object of the present invention is to provide an apparatus combining co-ordinated valve hole punching means and air valve applying means and particularly such combination associated with an endless conveyor for carrying inner tubes therealong.

A further and important object of the invention is to provide an air hole cutting and valve mounting apparatus which can be positioned at any desired point along an endless conveyor for inner tubes particularly during the manufacture thereof and which apparatus will cut the air holes in the tubes and apply air valves at said holes in co-ordination with the movement of the belt.

Another important object of the invention is to provide a cutter for air holes in inner tubes which will draw the tube to the cutter, retain the cut portion of the tube against the cutter and remove the same from the tube and then discharge the cut portion into a receptacle therefor.

A still further object of the invention is to provide a rotating device which will retain a valve stem during a portion of its rotation, forcefully apply the valve stem to an inner tube at a cut portion thereof and quickly withdraw from the valve stem at the time of affixing the same to the tube.

Another important object of the invention is to provide an apparatus for cutting air holes in inner tubes being carried by a continuously moving conveyor and affix air valve stems to said tube air holes with the cutting of the hole in the tube and the movement of the valve stem against the tube being controlled through floating supports for the conveyor.

It is also an object of the invention to provide automatic means for driving an inner tube air hole cutter and valve stem applier in co-ordination with the position of inner tubes being carried by a conveyor belt.

A very important object of the invention is to provide apparatus having an air hole cutter and valve stem applier for inner tubes upon a continuously moving conveyor with the operation of all elements being co-ordinated and completely automatic.

Further and important objects of the invention will be in part pointed out and in part obvious with the following detailed description of the accompanying drawings wherein:

FIG. 4 is an enlarged top plan view of the present apparatus with a portion broken away.

FIG. 5 is an enlarged detailed cross-sectional view of the cutter, stem applier, belt support and plug receptacle portion of the apparatus taken on line 5—5 of FIG. 4.

FIG. 6 is a longitudinal section of a portion of the apparatus at the start of its operation.

FIG. 7 is a view similar to FIG. 6, but with the elements at the position of cutting the air hole in the inner tube.

FIG. 8 is an enlarged sectional detailed view of the cutting of the inner tube.

FIG. 9 is a view similar to FIG. 6, but with the elements in their position of applying the valve stem to a tube.

FIG. 10 is a further view similar to FIG. 6, but with the elements in the position for discharging the plug cut from the inner tube.

FIG. 13 is a greatly enlarged detailed sectional view of the valve stem setter taken at right angles to the view thereof in FIG. 5.

FIG. 14 is an enlarged side elevation of the drive shaft control mechanism.

FIG. 15 is an enlarged side elevation of the timing mechanism for operating the clutch solenoid.

Figure 1:
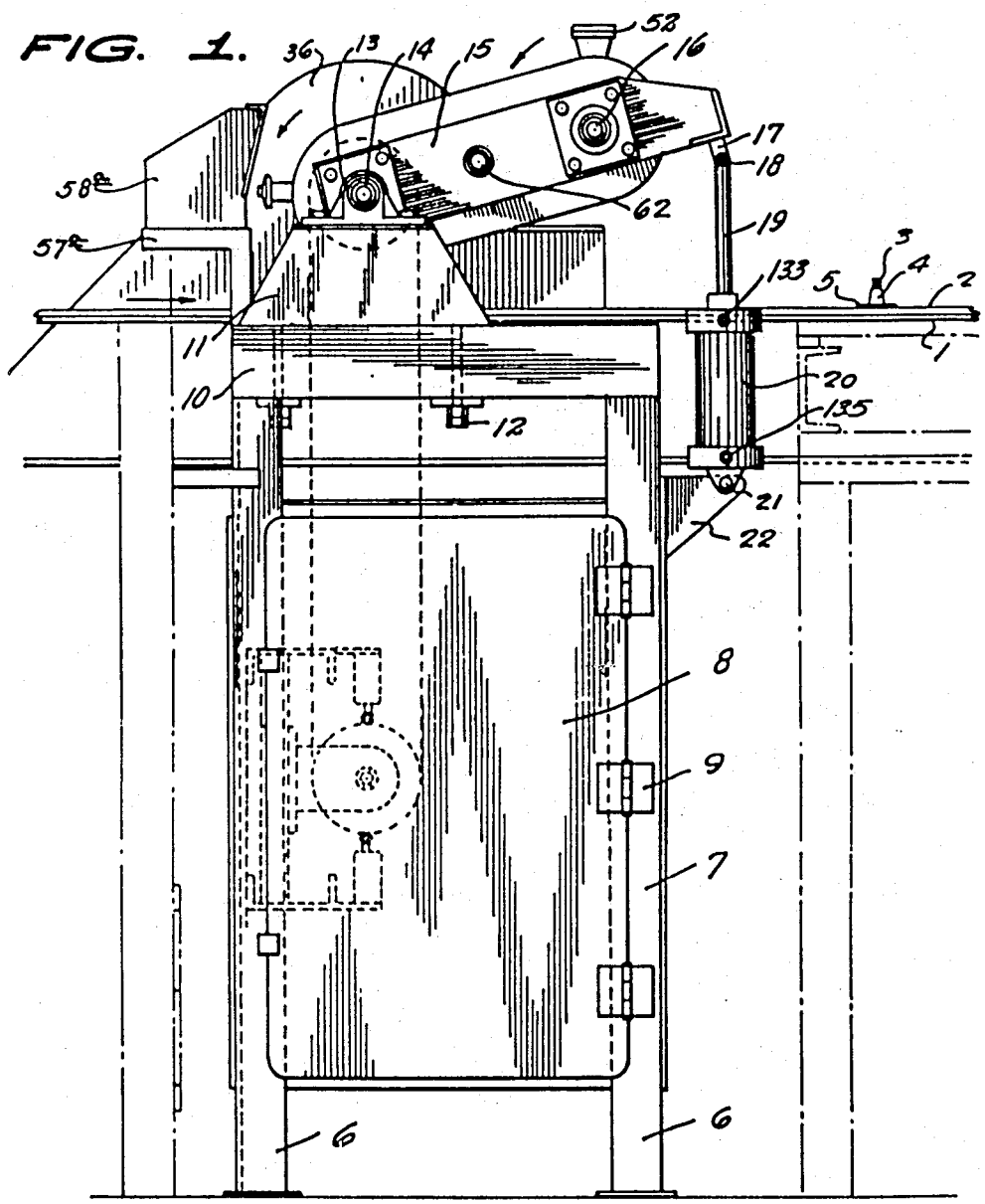
FIG. 1 is a side elevation of the present apparatus.
Figure 2:
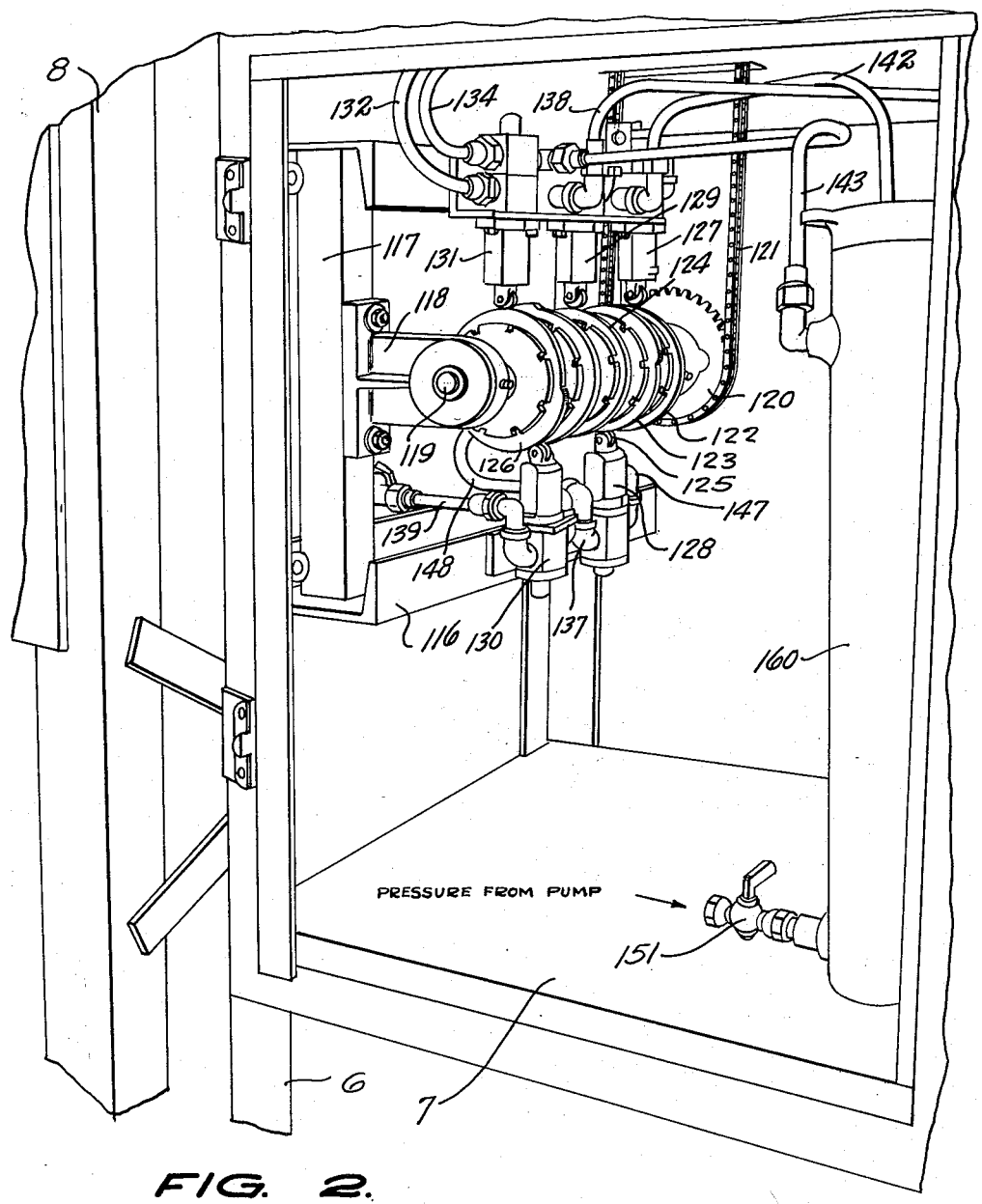
FIG. 2 is an enlarged perspective view of the cam controls for the apparatus.

And FIG. 16 is a diagram illustrating the various chain drives and a part of the conveyor of the apparatus.

Referring now more particularly to the accompany drawings wherein like and corresponding parts are designated by the same reference character, numeral 1 generally indicates a conventional endless belt conveyor supporting thereon a series of rubber inner tubes. Said tubes may be either continuous tubing or a plurality of lengths of tubing, each cut to proper size for forming the inner tube, for example, of a pneumatic tire before the ends thereof are joined for forming an annular tube. To each tube 2 there is affixed an air valve 3 of conventional type encased or not in a rubber sheathing 4 and having a flat annular rubber base 5.

The present automatic tube hole punch and valve setter can have such a belt 1 as a part thereof or the present device may be joined to any conventional belt conveyor. The automatic hole punch and tube valve setter consists of a plurality of legs 6 for supporting a cabinet 7 upon a horizontal support such as a floor and which cabinet has a door 8 connected thereto by hinges 9 for access to the interior of the cabinet. Said legs 6 further support a rectangular frame 10 above said cabinet. A base 11 is mounted upon one side of frame 10 and joined thereto by bolts 12 while a bearing 13 is mounted upon the top of said base and has one end of a shaft 14 rotatably supported in said bearing.

An elongated support 15 has shaft 14 extending through one end portion thereof while a second shaft 16 parallel to shaft 14 has one end rotatably supported in the opposite end portion of said support. The end of said support adjacent shaft 16 has a link 17 pivotally connected at 18 to piston rod 19 of a pneumatic cylinder 20, which cylinder in turn is pivotally connected at 21 to a bracket 22 fixedly attached to cabinet 7.

An angle iron 24 connects support 15 to a second support 23 extending parallel to support 15 and having shaft 14 rotatably extending through the end portion thereof. Said angle iron 24 has a link 25 pivotally connected at 26 to piston rod 27 of a second pneumatic cylinder 28.

The opposite side 29 of frame 10 has a bracket 30 mounted thereon supporting a second bearing 31 for shaft 14.

A plurality of arms 32 of which only one is shown support a plate 33 extending from side 29 of frame 10. Said plate supports a wall 34 which in turn supports a third bearing 35 for the opposite end of shaft 14.

A guard 36 houses a chain 36a encircling a sprocket 36b fixedly connected to shaft 14 for rotating the same.

Said chain in turn is connected to driving means which may be an electric motor co-ordinated with the movement of belt 1 or to a second sprocket 36c attached to rotary shaft 36d supporting belt 1 and rotating in co-ordination with said belt.

An electrical solenoid 37 is connected by wires 38 for receiving an electrical impulse from any conventional timing mechanism (see FIG. 15 for example) which is co-ordinated with the surface speed of conveyor belt 1. For example, a cam 161 driven by a link belt P.I.V. unit 164 driven by the conveyor 1 for being rotated one revolution per tube length can by means of cam block 162 trip a normally open micro switch 163 connected to said wires 38 for closing the switch energizing said solenoid. Solenoid 37 operates a control rod 39 pivotally connected at 40 to an arm 41 fixedly connected to shaft 42 supported by bearings 43 and 44. Said arm 41 is also fixedly connected to a pair of fingers 45 and 46 positioned for engaging cams 47 and 49 respectively fixedly mounted upon shaft 14. These fingers 45 and 46 engage the periphery of cams 47 and 49 and will abut projection 48 of each of said cams for preventing the clockwise rotation of shaft 14 as viewed in FIG. 14. A spring (not shown) tends to pull arm 41 for retaining fingers 45 and 46 against said cams while solenoid 37 operates to pull said fingers from engagement with said cams. Shaft 14 is driven in a clockwise direction as viewed in FIGS. 14 and 16 except when stopped by engagement of fingers 45 and 46 with projections 48. A clutch 49 connects the sprocket 36b within housing 36 to shaft 14 for permitting the stopping of said shaft by said fingers. Said clutch may be any conventional single revolution type such as for example the Hilliard Single Revolution Clutch produced by the Hilliard Corporation and which clutch automatically disengages said sprocket from said shaft at the same point of rotation for each operating cycle.

A guard 50 encases a sprocket 50a fixedly mounted on shaft 14 and around which chain 121 extends, as will be hereafter described.

A base 51 is fixedly connected to shaft 14 for carrying the tube hole cutter therewith.

A shaft 16 is rotatably supported by members 15 and 23 and extends parallel to shaft 14. Said shaft 16 supports the valve stem setter 52 which has a central bore 53 surrounded by a plurality of small bores 54 and which valve setter is in threaded engagement with a carrier 55 mounted on shaft 16. Said valve setter has a central recess 67 for receiving the valve stem 4 therein and a series of bores 65 placing cavity 66 in communication with small bores 54, which cavity 66 is in communication with a hollow interior of a housing 56 through bore 66a and opening 66b. Said housing 56 slideably surrounds an end portion of said carrier. A key 68 fixedly connects carrier 55 to shaft 16. A pipe 57 is connected to housing 56 in communication with the hollow interior thereof.

A third shaft 62 is fixedly supported by members 15 and 23 between and parallel with shafts 14 and 16. A gear 61 is fixedly connected to shaft 14 and meshes with gear 63 rotatably mounted on shaft 62 while gear 63 meshes with a third gear 64 fixedly connected to shaft 16.

A patch retainer 58a is supported by an angular bracket 57a mounted on frame 10 laterally of belt 1 and will be described more in detail hereafter.

Carrier 51 is connected to shaft 14 by key 70 and has a lateral tubular projection 71 with an internally threaded longitudinal bore 72 in communication with passageway 73 in said carrier which in turn communicates with passageway 74 connected to tube 60. A plurality of seals 75 surround carrier 51 and support housing 59 through which passageway 74 extends.

Hole cutter 58 has a threaded end portion 76 engaging threads 72 and adjustably positioned by nut 77 on carrier 51. Said cutter has a longitudinal bore 78 open at one end to passageway 73 and at its other end to a threaded bore 79 in which is adjustably positioned the cutter 80 in threaded engagement therewith. Said cutter has a bore 81 communicating with bore 78 and an enlarged bore 82 also at one end and communicating with bore 81. Said cutter open end 83 is tapered forming a sharp annular die while a set screw 85 retains cutter 80 in any adjusted position.

A connector 86 is joined by screw 87 to housing 59 and by screws 88 to member 23 for preventing the rotation of said housing. Similarly, a connector 90 is joined by screw 91 to housing 56 and by screws 92 to member 23 for preventing the rotation of housing 56.

Housing 58 has a short front wall 95 with a perforated plate 94 hooked at one end to housing 58 and resting at its opposite end on wall 95. A second and similar perforated plate 96 is similarly mounted on housing 58 but spaced from plate 93 leaving opening 97 in the center of said housing facing cutter 58.

Below belt 1, frame 10 has a laterally extending angle iron 98 to which a second angle iron 100 is pivotally connected at 99. Said angle iron 100 supports a plate 101 upon which belt 1 slides. A bolt 102 extends downwardly through an opening in an angle iron 103 connected to frame 10 and through a second angle iron 104 while the coil spring surrounding said bolt is positioned between angle irons 103 and 104. Nuts 106 are in threaded engagement with bolt 102 below angle iron 104.

A similar arrangement consists of angle iron 107 connected to frame 10 and pivoted at 108 to a free angle iron 109 supporting a second plate 110 slidably supporting belt 1. A bolt 111 extends from plate 110 through an angle iron 112 and angle iron 113 both connected to frame 10 while a coil spring 15 is positioned between angle irons 112 and 113 and nuts 114 threadedly engage bolt 111 beneath angle iron 113.

Upon one side of the interior of cabinet 7 there is mounted a shelf 16 supporting an upright 117 from which extends a bearing 118 rotatably supporting one end of a shaft 119. The other end of shaft 119 is similarly supported by a bearing (not shown) and has a pinion 120 fixedly mounted thereon and around which chain 121 is positioned for driving shaft 119. Said shaft further has a series of cams 122, 123, 124, 125, and 126 fixedly mounted thereon for rotation therewith. Compressed air valves 127, 129, and 131 have their control rods engaging the periphery of said cams 122, 124, and 126 respectively. Exhaust valves 128 and 130 have their control members engaging the periphery of cams 123 and 125 respectively. Said valves are fixedly connected to shelving 116.

Valve 131 is connected at one end to pipe 132 which in turn is connected to pipe 133 connected to one end of cylinders 20 and 28. A pipe 134 is connected to the opposite end of cylinder 131 and to pipe 135 connected to the opposite end of cylinders 20 and 28.

Valve 127 is connected by pipe 137 to pipe 57 connected to housing 56. Valve 128 is connected by pipe 137 to said pipe 57.

Valve 129 is connected by pipe 138 to pipe 60 connected to housing 59 while valve 130 is connected by pipe 139 to said pipe 60.

Valve 127 is connected by pipe 140 to pipe 142 while valve 129 is connected by pipe 141 to said pipe 142 which in turn is connected to a reservoir 160 of compressed air. Said reservoir is also connected by a pipe 143 and branches 144 and 145 to opposite ends of valve 131 in which slides a piston 146 to be moved by cam 126.

Figure 12:
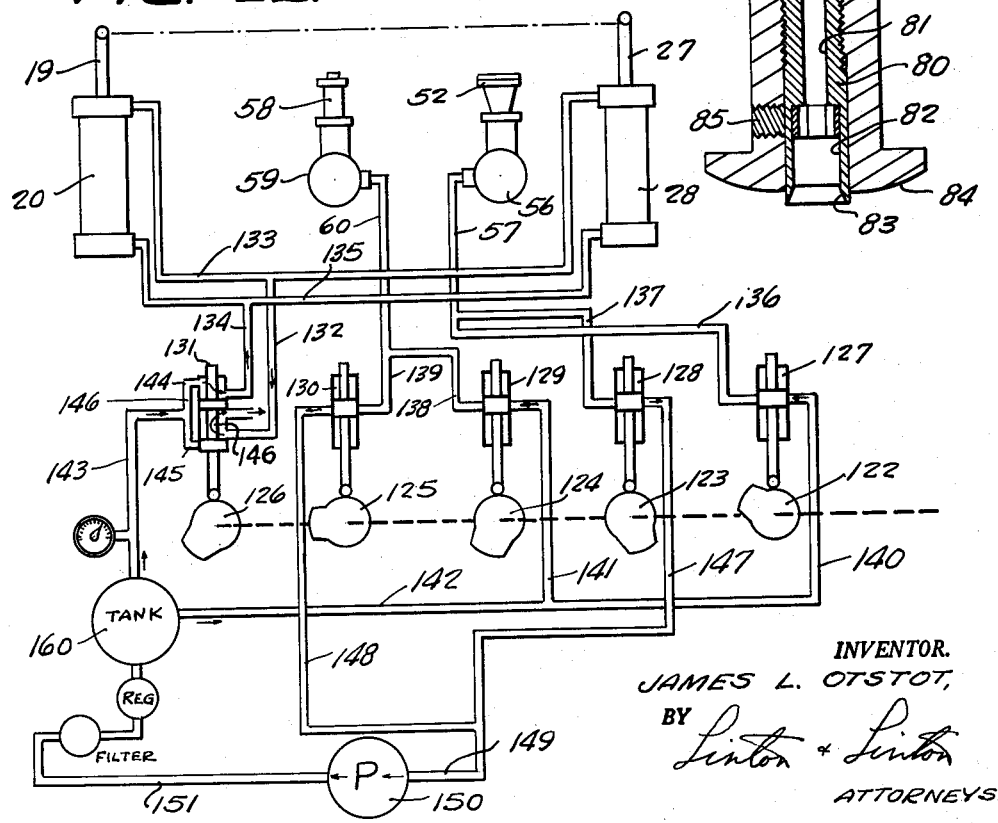
FIG. 12 is a diagram of the pneumatic controls for the present apparatus.

Valve 128 is connected by pipe 147 to pipe 149 while valve 130 is connected by pipe 148 to said pipe 149 which in turn is connected to a source for producing suction therein which in the present FIG. 12 is shown by way of an example as attached to the intake end of a pump 150.

The output end of said pump is connected by pipe 151 to reservoir 160.

Figure 3:
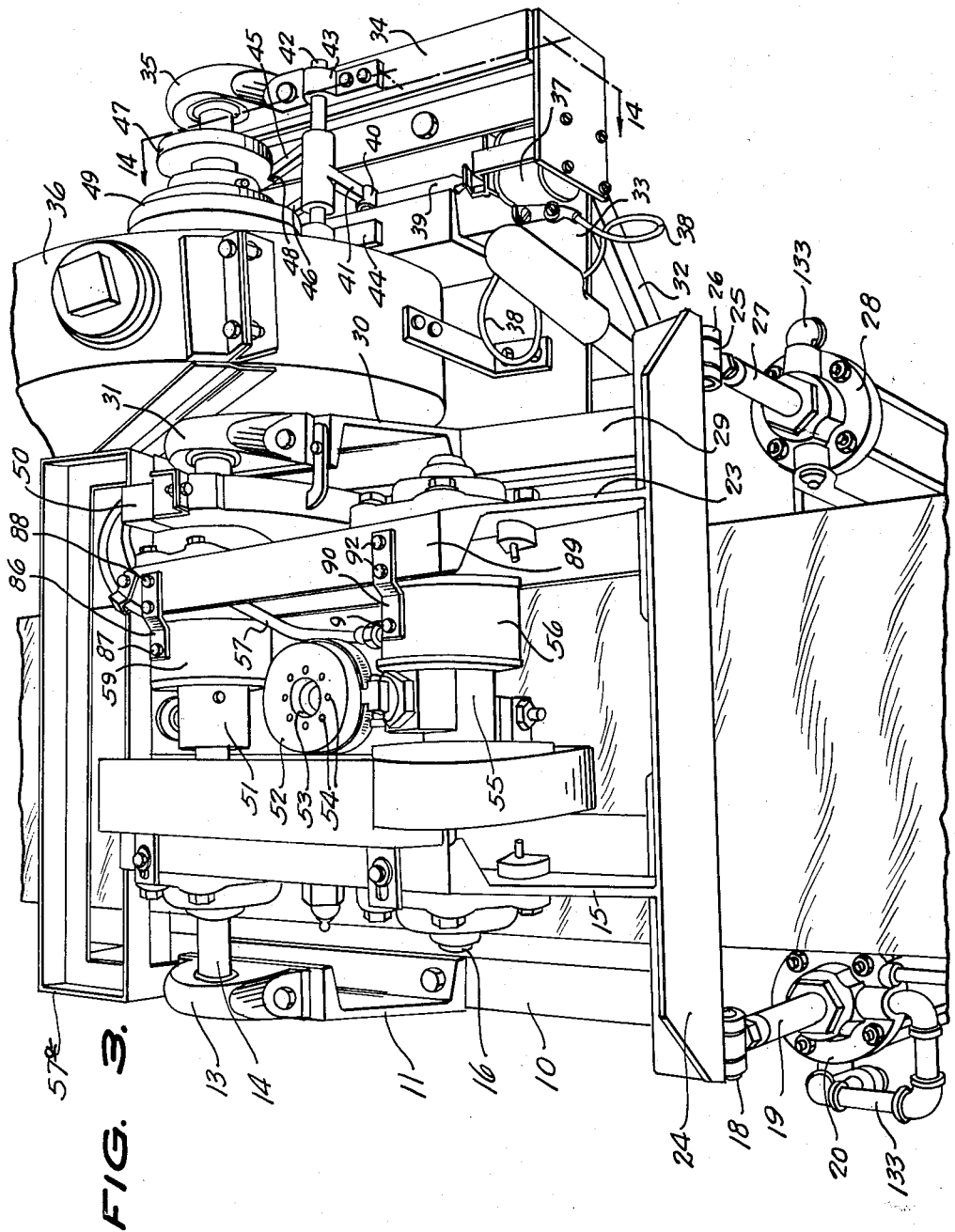
FIG. 3 is a perspective view of the top of the apparatus as viewed from the tube discharge end thereof.
Figure 11:
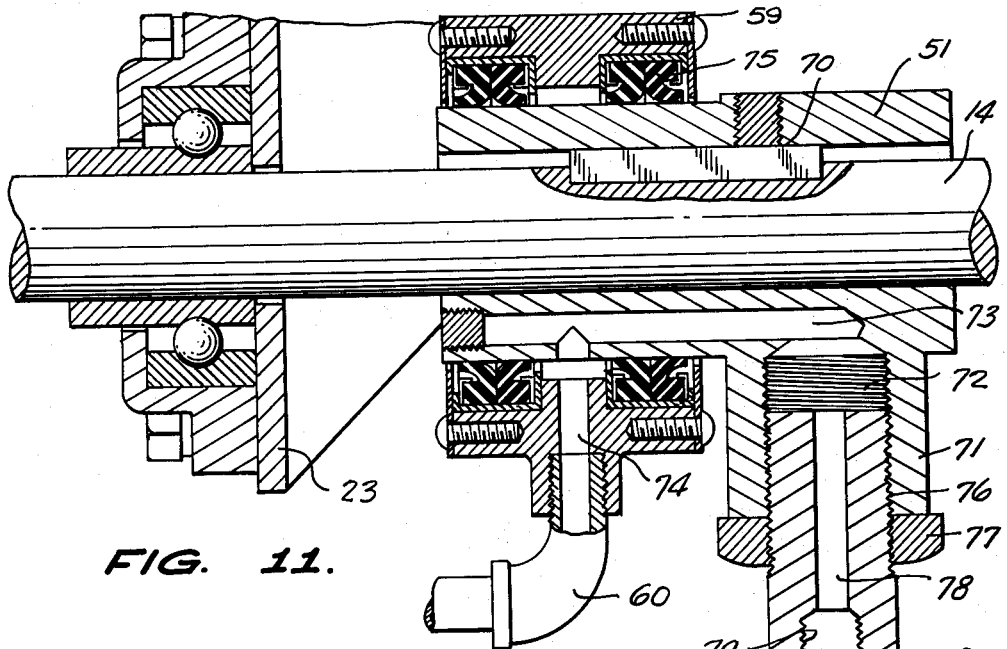
FIG. 11 is a greatly enlarged detailed sectional view taken on line 11—11 of FIG. 5.

In the operation of the present apparatus, particularly that carried by cabinet 7, the cabinet is positioned under a belt conveyor 1 positioning plates 101 and 110 against the bottom face of the belt and the members 15, 23 and 24 above the belt by threading the belt between said plates and said members. The driving means for shaft 14 within housing 36 is connected to a motor or to shaft 36d around which belt 1 travels and is thereby co-ordinated with the surface movement of said belt for driving shaft 14 in a clockwise direction. Similarly, solenoid 37 is connected to said timing means as previously described co-ordinated with the movement of belt 1. A series of inner tubes or a continuous strip of tubing is positioned flat upon belt 1 with the upper face of the tube to receive the valve stem facing upwardly. As indicated in FIG. 3, fingers 45 and 46 are engaging cams 47 and 49 and particularly the projections 48 to prevent the rotation of shaft 14 with the stem placing head 52 facing upwardly whereupon the valve stem 4 is inserted in openings 53 and 67 with flange 5 seated upon the annular top of said valve stem setter.

The conveyor belt being caused to move in the direction of the arrow of FIG. 1 with tubing 2 thereon will be at the proper time by said timing means trip solenoid 37 pulling shaft 39 inwardly thereof for a short period withdrawing fingers 45 and 46 from projections 48 whereupon shaft 14 will be permitted to rotate for one revolution of said cams until the fingers 45 and 46 again engage projections 48 due to the action of the spring attached to arm 41. This rotation of shaft 14 starts with the elements shown as positioned in FIG. 6, and with the rotation of shaft 14, the cutter 58 is brought downwardly to the vertical position shown in FIG. 7 whereupon it engages and cuts into tube 2 against plate 101 which permits the tube to move downwardly slightly to prevent the cutter from cutting through more than the top layer of the tube. During this movement of the cutter 58, cam 125 has open valve 130 creating a suction in pipe 69, housing 59 through passageway 74, 73, 78, 81, and 82 causing the severed patch of inner tube within opening 83 to be retained against said cutter and such suction continues until the cutter completes a revolution around to the position of FIG. 10 whereupon cam 125 shuts valve 130 and cam 124 opens valve 129 sending compressed air through pipe 69 blowing the patch from cutter 83 through opening 97 into retainer 58.

During the rotation of shaft 14, gear 61 is rotated therewith and by gear 63 rotates gear 64 in such a manner that the valve stem head 52 rotates from the upright position of FIG. 6 to the right of FIG. 7 to the downwardly extending vertical position of FIG. 9 where it engages the tube 2 at the hole just cut by the cutter 58. During this movement from FIG. 6 to FIG. 9, cam 123 opens valve 128 creating a suction in pipe 137 to pipe 57, housing 56, cavity 66, and small bores 65 and 54 drawing valve flange 5 against said head 52. As soon as said head engages the position of FIG. 9, cam 123 closes valve 128 while cam 122 opens valve 127 forcing compressed air through pipe 137 to pipe 57 and small bores 54 forcing flange 5 against the tube opening therebeneath which is permitted to slightly give by the downward movement of plate 110 against spring 115. Also, at the time of opening valve 127, cam 126 moves piston 146 to the position shown in FIG. 12 opening pipe 145 to pipe 132 and pipes 133 to the upper end of cylinders 20 and 28 causing piston rods 19 and 27 to move inwardly to said cylinders pulling members 15, 23, and 24 downwardly against said tubing.

Directly after the mounting of the valve stem upon the tube, cam 122 closes valve 127 and cam 126 moves piston 146 downwardly opening pipes 144 to 134 and the lower ends of cylinders 20 and 28 moving members 15, 23 and 24 quickly and upwardly to the position of FIG. 10 pulling head 52 away from the valve stem.

As soon as head 52 again reaches the position of FIG. 6, fingers 45 and 46 engage projection 48 stopping the rotation of shaft 14 permitting an operator to mount a second valve stem upon head 52, and the aforementioned cycle again takes place upon the second actuation of solenoid 37.

Said valves 127–130 may be conventional two way valves, while valve 131 may be a conventional four way valve.

The present invention is capable of considerable modification, and such changes thereto as come within the scope of the appended claims are deemed to be a part of the present invention.

I claim:

1. A machine for punching a hole in a rubberized tube for receiving a valve stem and setting a valve stem therein comprising a driven conveyor for supporting at least one tube in a flat position and moving the same, a rotatably driven shaft positioned above said conveyor, a tube cutter connected to and extending radially from said shaft for movement therewith and positioned for engaging said tube for cutting a hole therein, a second rotatably driven shaft positioned above said conveyor, a valve stem setter fixedly connected to said second shaft and extending radially therefrom for movement therewith, means for moving said second driven shaft downwardly and upwardly above said conveyor and thereby said valve stem setter to engagement with said tube at the hole cut therein and away therefrom, means for retaining a valve stem on said setter until engagement with said tube, further means for forcing the valve stem from said setter against said tube upon contact of setter and tube for mounting said valve stem on said tube and means for co-ordinating the movement of said conveyor and said shaft for properly positioning the tube relative to said cutter and said setter.

2. A machine for punching a hole in a rubberized tube for receiving a valve stem and setting a valve stem therein comprising a driven conveyor for supporting at least one tube in a flat position thereon and moving the same, a rotatably driven shaft positioned above and laterally of said conveyor, a member having an annular cutter at one end being connected at its opposite end to said shaft extending radially therefrom for contacting and cutting said tube, a second rotatably driven shaft positioned above and laterally of said conveyor, pivotal means rotatably supporting said second driven shaft above said conveyor for movement of said second shaft towards and from said conveyor, a valve stem setter connected at one end to said second shaft and extending radially therefrom, said valve stem setter having its opposite end of a configuration for receiving a valve stem thereon, means for pivoting said pivotal means and thereby moving said valve stem setter opposite end against and from said tube, means for forcing a valve stem from said setter opposite end when engaging said tube for mounting the valve stem on said tube at the cut in said tube, and means for co-ordinating the movements of said conveyor, said shafts, said setter moving means and said forcing means for properly mounting the valve stem.

3. A machine for punching a hole in a rubberized tube for receiving a valve stem and setting a valve stem therein as claimed in claim 2, wherein resiliently supported plates are positioned beneath and against said conveyor below said shafts.

4. A machine for punching a hole in a rubberized tube for receiving a valve stem and setting a valve stem therein as claimed in claim 2, wherein said pivotal means consists of a supporting frame pivotally connected to said first shaft and rotatably supporting said second shaft and said means for moving said pivotal means includes cylinders with piston rods connected to said frame and means for moving said piston rods in said cylinders and thereby said frame to and from said conveyor.

5. A machine for punching a hole in a rubberized tube for receiving a valve stem and setting a valve stem therein as claimed in claim 2, wherein said means for forcing a valve stem from said setter opposite end includes a plurality of bores in said valve stem setter opening at said setter opposite end and means for forcing air through said small bores against the valve stem on said setter when said setter engages said tube.

6. A machine for punching a hole in a rubberized tube for receiving a valve stem and setting a valve stem therein as claimed in claim 2, wherein said co-ordinating means includes mechanical means driven by said conveyor for driving said first shaft, gearing connecting said first and second shafts, cam-operated valves in operable connection with said driven means, pneumatic means for operating said setter moving means and said forcing means controlled by said valves and a source of compressed air connected to said valves.

7. A machine for punching a hole in a rubberized tube for receiving a valve stem and setting a valve stem therein as claimed in claim 2, wherein said valve stem setter has a plurality of bores opening at its opposite end, a source of suction is connected to said bores for retaining a valve stem on said setter opposite end, means for supplying compressed air are connected to said bores and means is provided for cutting off said suction when said setter contacts the tube, turning on the compressed air to said bores to force the valve stem against the tube and then turns off the compressed air while reconnecting the source of vacuum to said bores.

8. A machine for punching a hole in a rubberized tube for receiving a valve stem and setting a valve stem therein as claimed in claim 2, wherein said member has a bore opening at said annular cutter, means connects said bore to a source of vacuum during the cutting of the tube, cuts off said vacuum and connects said bore to a source of compressed air and then turns off said compressed air whereby said cutter picks up and discharges the material cut from the tube.

9. A machine for punching a hole in a rubberized tube for receiving a valve stem and setting a valve stem therein as claimed in claim 2, wherein said member has a bore opening at said annular cutter, means connects said bore to a source of vacuum during the cutting of the tube, thereafter during the rotation of said first shaft cuts off said vacuum and connects said bore to a source of compressed air and then turns off said compressed air whereby said cutter picks up and discharges the material cut from the tube, and a container is mounted above said conveyor and laterally of said annular cutter for receiving the discharged material.

10. A machine for punching a hole in a rubberized tube for receiving a valve stem and setting a valve stem therein as claimed in claim 2, wherein said member has a bore opening at said annular cutter, means connects said bore to a source of vacuum during the cutting of the tube, thereafter during the rotation of said first shaft cuts off said vacuum and connects said bore to a source of compressed air and then turns off said compressed air whereby said cutter picks up and discharges the material cut from the tube, an open side container mounted above said conveyor, perforated sheets mounted across said container open side and having an opening in line with said cutter for receiving the discharged material.

11. A machine for punching a hole in a rubberized tube for receiving a valve stem and setting a valve stem therein as claimed in claim 2, wherein said cutter member has a tubular carrier with said first shaft extending therethrough and connected thereto, a tubular projection extending laterally from said carrier and having a threaded bore, a tubular member with a threaded periphery in threaded engagement with said projection bore and a threaded bore, a tubular cutter having a threaded periphery in threaded engagement with said tubular member bore and a sharp annular cutting end and a passageway in said carrier opening into said projection bore and means for creating a vacuum during the tube cutting and pressure during the material discharge connected to said carrier passageway.

12. A machine for punching a hole in a rubberized tube for receiving a valve stem and setting a valve stem therein as claimed in claim 2, wherein said valve stem setter has a tubular carrier with said second shaft extending therethrough and connected thereto, a projection extending laterally from said carrier and having a threaded bore, a member with a threaded periphery in threaded engagement with said carrier base and bores opening into said carrier bore, a resilient pad mounted on said member having bores communicating with said member bores and a central opening, said member having a central recess in line with said pad opening for receiving a valve stem therein with its base mounted on said pad over said pad bores and means for connecting said projection bore to a source of vacuum while carrying said valve stem and a source of air under pressure for forcing said valve stem therefrom onto said tube.

13. A machine for punching a hole in a rubberized tube for receiving a valve stem and setting a valve stem therein as claimed in claim 2, wherein said co-ordinating means includes means driven by said conveyor, a clutch operatively connecting said means and said first shaft, means normally stopping the rotation of said first shaft and a solenoid operatively connected to said conveyor for temporarily releasing said stopping means permitting a rotation of said first shaft for one cutting and valve stem setting operation of the machine.

14. A machine for punching a hole in a rubberized tube for receiving a valve stem and setting a valve stem therein as claimed in claim 2, wherein said means for pivoting said pivoted means includes pneumatic means for pivoting said pivoted means, and said means for forcing a valve stem from said setter includes bores in said setter, and a source of compressed air is connected to said bores, and said pneumatic means and valve means for said source of compressed air is operatively controlled by said first shaft.

References Cited in the file of this patent

UNITED STATES PATENTS

| | | |
|---|---|---|
| 1,956,050 | Snyder | Apr. 24, 1934 |
| 2,272,894 | Hulslander | Feb. 10, 1942 |
| 2,272,895 | Stevens | Feb. 10, 1942 |
| 2,311,600 | Shook | Feb. 16, 1943 |

FOREIGN PATENTS

| | | |
|---|---|---|
| 119,767 | Australia | Mar. 22, 1945 |